United States Patent
Huang et al.

(10) Patent No.: US 11,720,273 B2
(45) Date of Patent: Aug. 8, 2023

(54) CODEWORD ERROR LEVELING FOR 3DXP MEMORY DEVICES

(71) Applicant: Micron Technology, Inc., Boise, ID (US)

(72) Inventors: Jian Huang, Union City, CA (US); Zhenming Zhou, San Jose, CA (US); Zhenlei Shen, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/323,089

(22) Filed: May 18, 2021

(65) Prior Publication Data
US 2022/0374157 A1 Nov. 24, 2022

(51) Int. Cl.
*G06F 12/00* (2006.01)
*G06F 3/06* (2006.01)
*G06F 11/07* (2006.01)

(52) U.S. Cl.
CPC .......... *G06F 3/0644* (2013.01); *G06F 3/0604* (2013.01); *G06F 3/0688* (2013.01); *G06F 11/076* (2013.01); *G06F 11/0727* (2013.01)

(58) Field of Classification Search
CPC .... G06F 3/0644; G06F 3/0604; G06F 3/0688; G06F 11/0727; G06F 11/076
See application file for complete search history.

(56) References Cited

U.S. PATENT DOCUMENTS

| | | |
|---|---|---|
| 10,365,966 B1 | 7/2019 | Chilappagari et al. |
| 2008/0235561 A1 | 9/2008 | Yang |
| 2014/0258804 A1* | 9/2014 | Pangal ................ G06F 11/1076 714/752 |
| 2018/0034593 A1 | 2/2018 | Xu et al. |
| 2018/0189125 A1* | 7/2018 | Karlik ............. G11C 29/12005 |
| 2018/0287636 A1* | 10/2018 | Rom .................. H03M 13/1102 |
| 2019/0140784 A1 | 5/2019 | Xi et al. |
| 2019/0173657 A1 | 6/2019 | Tomasi et al. |
| 2020/0333974 A1* | 10/2020 | Basu .................... G06F 11/3037 |
| 2022/0066920 A1* | 3/2022 | Basu ...................... G06F 3/064 |

OTHER PUBLICATIONS

PCT International Search Report and Written Opinion for International Application No. PCT/US2022/029910 dated Sep. 8, 2022, 9 pages.

* cited by examiner

*Primary Examiner* — John A Lane
(74) *Attorney, Agent, or Firm* — Lowenstein Sandler LLP

(57) ABSTRACT

Disclosed is a system that comprises a memory device and a processing device, operatively coupled with the memory device, to perform operations that include, identifying, by the processing device, a plurality of partitions located on a die of the memory device. The operations performed by the processing device further include selecting, based on evaluating a predefined criterion reflecting a physical layout of the die of the memory device, a first partition and a second partition of the plurality of partitions. The operations performed by the processing device further include generating a codeword comprising first data residing on the first partition and second data residing on the second partition.

20 Claims, 6 Drawing Sheets

| PA15 | PA14 | PA13 | PA12 |
|---|---|---|---|
| PA11 | PA10 | PA9 | PA8 |
| PA7 | PA6 | | |
| Periphery Circuit 210 | | | |

FIG. 2

| PA15 | PA14 | | |
|------|------|-----|-----|
| | PA10 | PA9 | PA8 |
| PA7 | | PA5 | PA4 |
| PA3 | PA2 | | |
| Periphery Circuit 310 | | | |

FIG. 3

CODEWORD ERROR LEVELING FOR 3DXP MEMORY DEVICES

TECHNICAL FIELD

Embodiments of the disclosure relate generally to memory sub-systems, and more specifically, relate to codeword error leveling for 3DXP memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates an example physical layout of partitions of a memory device.

FIG. 3 illustrates another example physical layout of partitions of a memory device.

DETAILED DESCRIPTION

Figure 1:
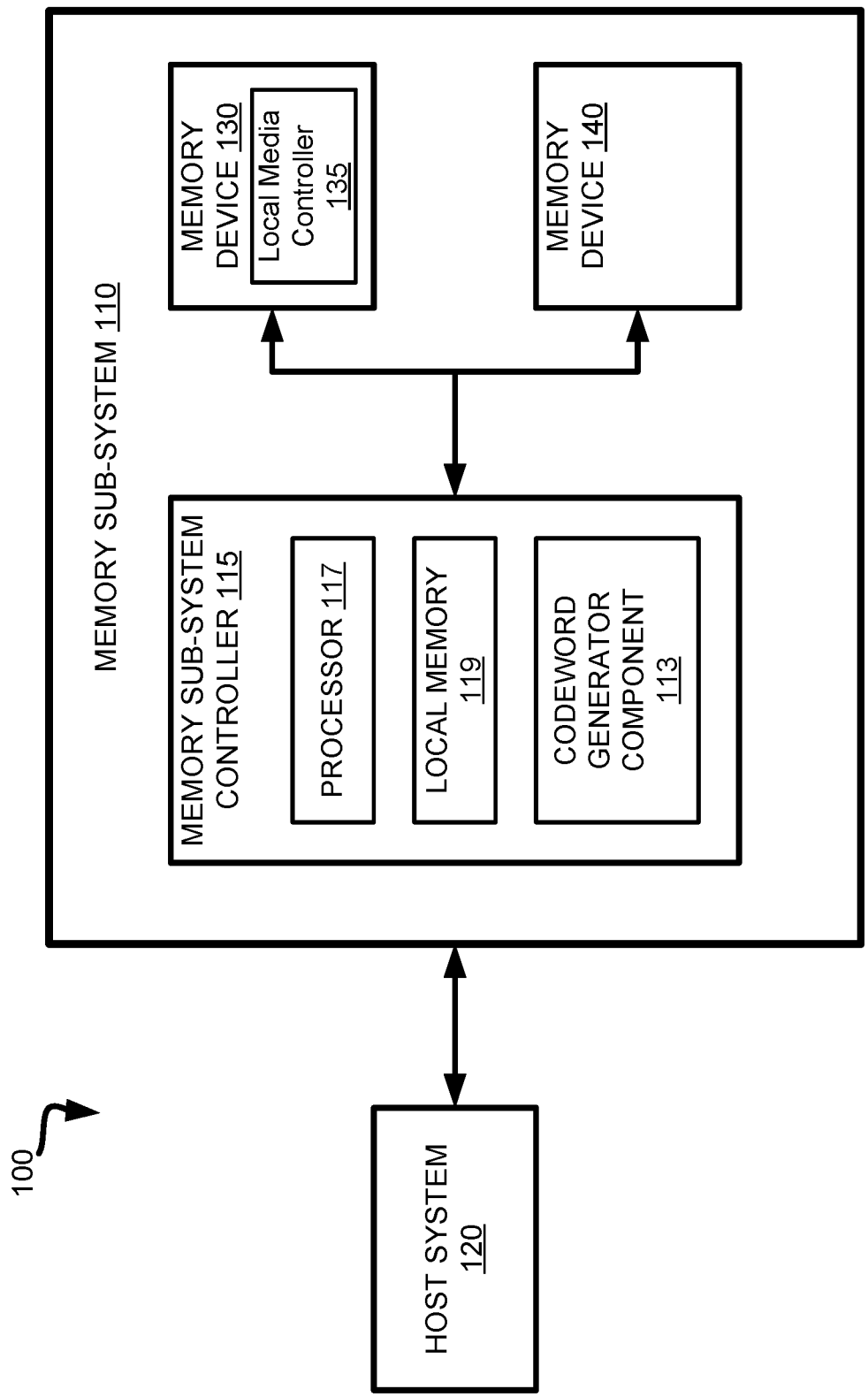
FIG. 1 illustrates an example computing system that includes a memory sub-system in accordance with some embodiments of the present disclosure.

Aspects of the present disclosure are directed to codeword error leveling for 3DXP memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is three-dimensional cross-point ("3D cross-point" or "3DXP") memory devices that are a cross-point array of non-volatile memory that can perform bit storage based on a change of bulk resistance, in conjunction with a stackable cross-gridded data access array. Another example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., 3DXP devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Partitioning can refer to a process where memory is divided up into sections (e.g., partitions) for use by one or more applications, processes, operations, etc. A memory device can be segmented into two or more partitions. A partition can be individually addressable and can contain information related to a specific application, process, operation, etc.

Data operations can be performed by the memory sub-system. The data operations can be host-initiated operations. For example, the host system can initiate a data operation (e.g., write, read, erase, etc.) on a memory sub-system. The host system can access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), etc.

A memory cell can be programmed (written to) by applying a certain voltage to the memory cell, which results in an electric charge being held by the memory cell. Certain voltages can be applied to memory cells through a power bus connected to a periphery circuit of the memory device. Given the physical layout of the memory device, partitions can be located at different distances from the periphery circuit. Due to this layout constraint, there can be a power drop or delay in reaching certain partitions of the memory device, which can result in voltage differences among the partitions. Voltage differences among the partitions can result in differences in the raw bit error rates (RBER) of each partition. For example, one partition can have a high RBER whereas another partition can have a low RBER.

The memory sub-system may encode data into a format for storage at the memory device(s). For example, a class of error detection and correcting codes (ECC) may be used to encode the data. Encoded data written to physical memory cells of a memory device can be referred to as a codeword. The codeword may include one or more of user data, error correcting code, metadata, or other information. The memory sub-system may consist of one or more codewords. The codewords may consist of data from one or more partitions.

In some memory sub-systems, codewords can include data from neighboring partitions. Since neighboring partitions are located around the same physical area of the memory device, the RBER associated with each of these partitions will be similar. Thus, if, for example, partitions 0 to 9 are each associated with a high RBER, then the codeword consisting of data from partitions 0 to 9 will also be associated with a high RBER. Another codeword consisting of data from partitions located at a different physical area of the memory device may be associated with a low RBER if each of the partitions are associated with a low RBER. Thus, two or more codewords can thus highly vary in their respective RBERs, which can result in performance issues, such as memory uncorrectable error correction code (UECC) errors.

Aspects of the present disclosure address the above and other deficiencies by having a memory sub-system that generates codewords that would include data from different physical locations of the memory device, thus providing more location diversity coverage and reducing RBER variation among codewords. For example, instead of generating a codeword with data from neighboring partitions, such as partition 0 to partition 5, where the RBER associated with each partition may be similar, the codeword can be generated with data from partitions located at different physical locations of the memory device, thus covering partitions associated with different RBERs. Since the partitions are from different physical locations of the memory device and thus are associated with different RBERs, the resulting codewords would no longer exhibit varying levels of RBER. Instead, the RBER level variation would be reduced among the codewords. In another example, a codeword can be constructed after determining the RBER associated with each partition. Thus, the codeword can be generated using partitions that are not all associated with high RBERs or are not all associated with low RBERs. Therefore, the RBER level variation may consequently be reduced among generated codewords.

Advantages of the present disclosure include, but are not limited to, significantly reducing the codeword-to-codeword RBER level variation, thus reducing the possibility of UECC errors and increasing performance due to the reduced RBER level variation among codewords.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a codeword generator component 113 that can generate codewords using partitions from different physical locations of a memory device or based on the RBER associated with each partition of the memory device. In some embodiments, the memory sub-system controller 115 includes at least a portion of the codeword generator component 113. In some embodiments, the codeword generator component 113 is part of the host system 110, an application, or an operating system. In other embodiments, local media controller 135 includes at least a portion of the codeword generator component 113 and is configured to perform the functionality described herein.

In one example, the codeword generator component 113 can generate a codeword using partitions from different physical locations of a die of a memory device. For example, the codeword generator component 113 can compare a physical address of one partition to a physical address of another partition. If the partitions are not neighboring partitions based on the physical addresses of the partitions, then data from the partitions can be used in generating the codeword. In another example, the codeword generator component 113 can generate a codeword using partitions with different RBERs. For example, the codeword generator component 113 can determine the RBER for each partition in a die of a memory device. Using the determined RBER for each partition, the codeword generator component 113 can generate a codeword with data from partitions with different RBERs. Thus, the codeword generator component 113 may reduce the codeword level RBER variation in a memory device, resulting in an improvement in the performance of the memory device. Further details with regards to the operations of the codeword generator component 113 are described below.

FIG. 2 illustrates an example physical layout of partitions of a memory device. As described above, a conventional method of generating codewords is by using data from neighboring partitions in a die of a memory device. For example, in certain implementations, a codeword may be generated using PA0, PA1, PA2, PA3, PA4, and PA5, representing six neighboring partitions, as depicted in FIG. 2. PA0 to PA3 may be closer in distance to a periphery circuit 210 than, for example, PA12 to PA15. This is due to the physical layout of the memory device. Given this difference in distance, when a power bus delivers power to the different partitions of the memory device, there may be a drop in power in the partitions that are farther away from the periphery circuit 210. Due to this power drop, there may be a higher RBER in partitions closer to the periphery circuit 210, and there may be a lower RBER in partitions that are located farther away from the periphery circuit 210. Therefore, generating codewords using data from neighboring partitions can result in codewords with varying levels of RBER. As discussed above, this can result in reduced performance due to an increase in UECC errors.

Accordingly, FIG. 3 illustrates another example physical layout of partitions of a memory device. As shown in FIG. 3, in certain implementations, a codeword may be generated (e.g., by the codeword generator component 113 of FIG. 1) using PA0, PA1, PA6, PA11, PA12, and PA13, representing six partitions from differing locations on a die of the memory device. Since the partitions are located at different distances from a periphery circuit 310, the RBER may be varied among the partitions, thus avoiding extremely high RBER values which may result from selecting partitions with all high RBERs. Further details with regards to the operations of the codeword generator component 113 are described below.

Figure 4:
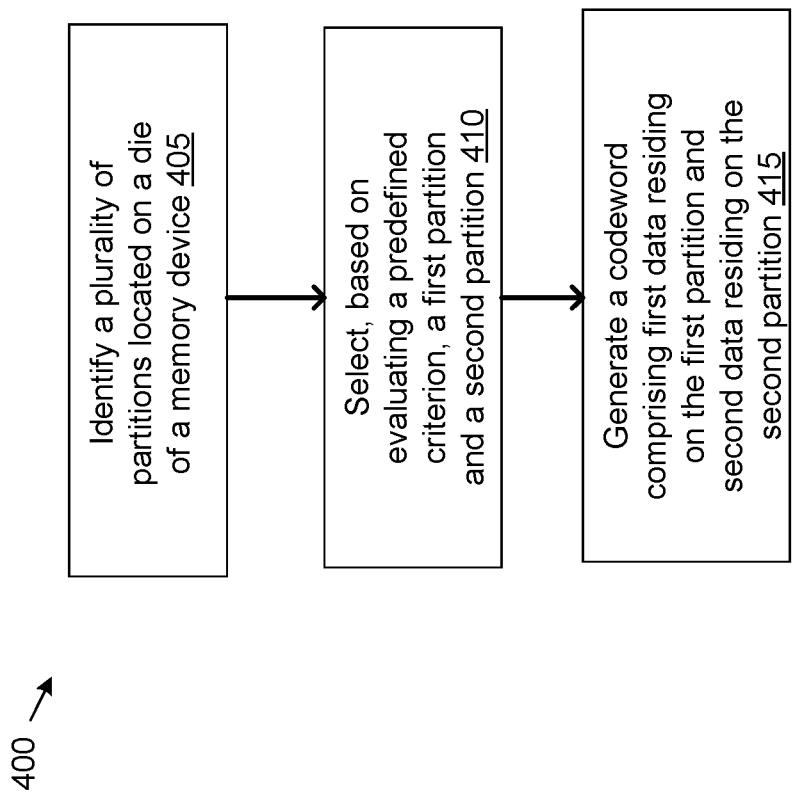
FIG. 4 is a flow diagram of an example method 400 to generate codewords for a memory device in accordance with some embodiments of the present disclosure.

FIG. 4 is a flow diagram of an example method 400 to generate codewords for a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the codeword generator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic identifies multiple partitions. The multiple partitions may be located on a die of a memory device. In an illustrative example, identifying the multiple partitions may include identifying multiple partitions residing on a randomly selected die of the memory device. In certain implementations, identifying the multiple partitions may be in response to a request, by the memory sub-system (e.g., the memory sub-system controller 115 of FIG. 1), to generate a codeword. In certain implementations, the memory device may be a 3DXP memory device.

At operation 410, the processing logic selects, based on evaluating a predefined criterion reflecting a physical layout of the die of the memory device, two partitions of the multiple partitions. In certain implementations, evaluating the predefined criterion reflecting the physical layout of the die of the memory device includes comparing a physical address of one of the selected partitions to a physical address of the other selected partition. In an illustrative example, the processing logic may compare the physical address of the first selected partition to the physical address of the second selected partition. In response to determining that the physical address of the first selected partition and the physical address of the second selected partition are not closely related in physical location, the processing logic may generate a codeword. Closely related physical addresses may include, but are not limited to, consecutive physical addresses. Closely related physical addresses may include physical addresses of partitions associated with the same or similar RBERs.

In certain implementations, selecting the two partitions of the multiple partitions is based on evaluating an error rate distribution of the die of the memory device. For example, evaluating the error rate distribution of the die of the memory device may include comparing a value of a data state metric for the first selected partition to a value of a data state metric for the second selected partition. In certain implementations, the data state metric includes a raw bit error rate (RBER) associated with each partition. In an illustrative example, the processing logic may compare the RBER of the first selected partition to the RBER of the second selected partition. In response to determining a difference between the RBER of the first selected partition and the RBER of the second selected partition, the processing logic may generate a codeword. For example, the difference between the RBER of the first selected partition and the RBER of the second selected partition may include identifying a high RBER for the first selected partition and a low RBER for the second selected partition. In certain implementations, evaluating the error rate distribution of the die of the memory device may be based on data measured in real time on the memory device. For example, the memory sub-system may determine the RBER of each partition residing on a die of the memory device. The metadata reflecting the measured RBER levels may be stored in a metadata structure, such as a table, on the memory device (e.g., the memory devices 130 or 140 of FIG. 1). In certain implementations, evaluating the error rate distribution of the die of the memory device may be based on bit error counts measured during the development of the memory device. In certain implementations, selecting the two partitions of the multiple partitions may include both evaluating the predefined criterion reflecting the physical layout of the die of the memory device and evaluating the error rate distribution of the die of the memory device.

At operation 415, the processing logic generates a codeword comprising data residing on the first selected partition and data residing on the second selected partition. In an illustrative example, generating the codeword includes identifying the data residing on the first selected partition and the data residing on the second selected partition. In certain implementations, generating the codeword may further include data residing on a certain number of partitions (e.g., six partitions) of the multiple partitions.

Figure 5:
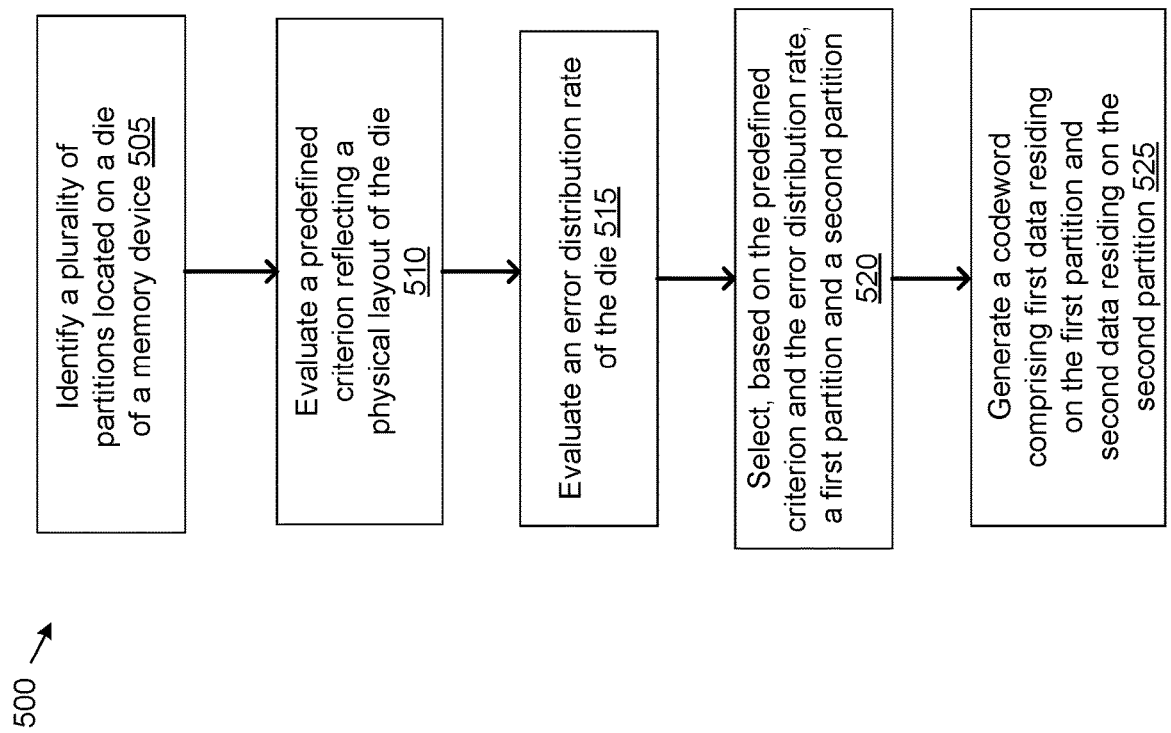
FIG. 5 is a flow diagram of an example method 500 to generate codewords for a memory device in accordance with some embodiments of the present disclosure.

FIG. 5 is a flow diagram of an example method 500 to generate codewords for a memory device, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the codeword generator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic identifies multiple partitions. The multiple partitions may be located on a die of a memory device. In an illustrative example, identifying the multiple partitions may include identifying multiple partitions residing on a randomly selected die of the memory device. In certain implementations, identifying the multiple partitions may be in response to a request, by the memory sub-system (e.g., the memory sub-system controller 115 of FIG. 1), to generate a codeword. In certain implementations, the memory device may be a 3DXP memory device.

At operation 510, the processing logic evaluates a predefined criterion reflecting a physical layout of the die of the memory device. In certain implementations, evaluating the predefined criterion reflecting the physical layout of the die of the memory device includes comparing a physical address of one of the partitions in the die to a physical address of another partition in the die. In an illustrative example, the processing logic may compare the physical address of the first partition in the die to the physical address of the second partition in the die. In response to determining that the physical address of the first partition and the physical address of the second partition are not closely related in physical location, the processing logic may generate a codeword. Closely related physical addresses may include, but are not limited to, consecutive physical addresses. Closely related physical addresses may include physical addresses of partitions associated with the same or similar RBERs.

At operation 515, the processing logic evaluates an error distribution rate of the die of the memory device. For example, evaluating the error rate distribution of the die of the memory device may include comparing a value of a data state metric for the first partition of the die to a value of a data state metric for the second partition of the die. In certain implementations, the data state metric includes a raw bit error rate (RBER) associated with each partition. In an illustrative example, the processing logic may compare the RBER of the first partition to the RBER of the second partition. In response to determining a difference between the first RBER and the second RBER, the processing logic may generate a codeword. For example, the difference between the RBER of the first partition and the RBER of the second partition may include identifying a high RBER for the first partition and a low RBER for the second partition. In certain implementations, evaluating the error rate distribution of the die of the memory device may be based on data measured in real time on the memory device. For example, the memory sub-system may determine the RBER of each partition residing on a die of the memory device. The metadata reflecting the measured RBER levels may be stored in a metadata structure, such as a table, on the memory device (e.g., the memory devices 130 or 140 of FIG. 1). In certain implementations, evaluating the error rate distribution of the die of the memory device may be based on bit error counts measured during the development of the memory device.

At operation 520, the processing logic selects, based on the predefined criterion reflecting the physical layout of the die and the error distribution rate of the die, two partitions of the multiple partitions. In certain implementations, the processing logic selects one partition of the multiple partitions based on the predefined criterion reflecting the physical layout of the die, and the processing logic selects the other partition of the multiple partitions based on the error rate distribution of the die.

At operation 525, the processing logic generates a codeword comprising data residing on the first selected partition and data residing on the second selected partition. In an illustrative example, generating the codeword includes identifying the data residing on the first selected partition and the data residing on the second selected partition. In certain implementations, generating the codeword may further include data residing on a certain number of partitions (e.g., six partitions) of the multiple partitions.

Figure 6:
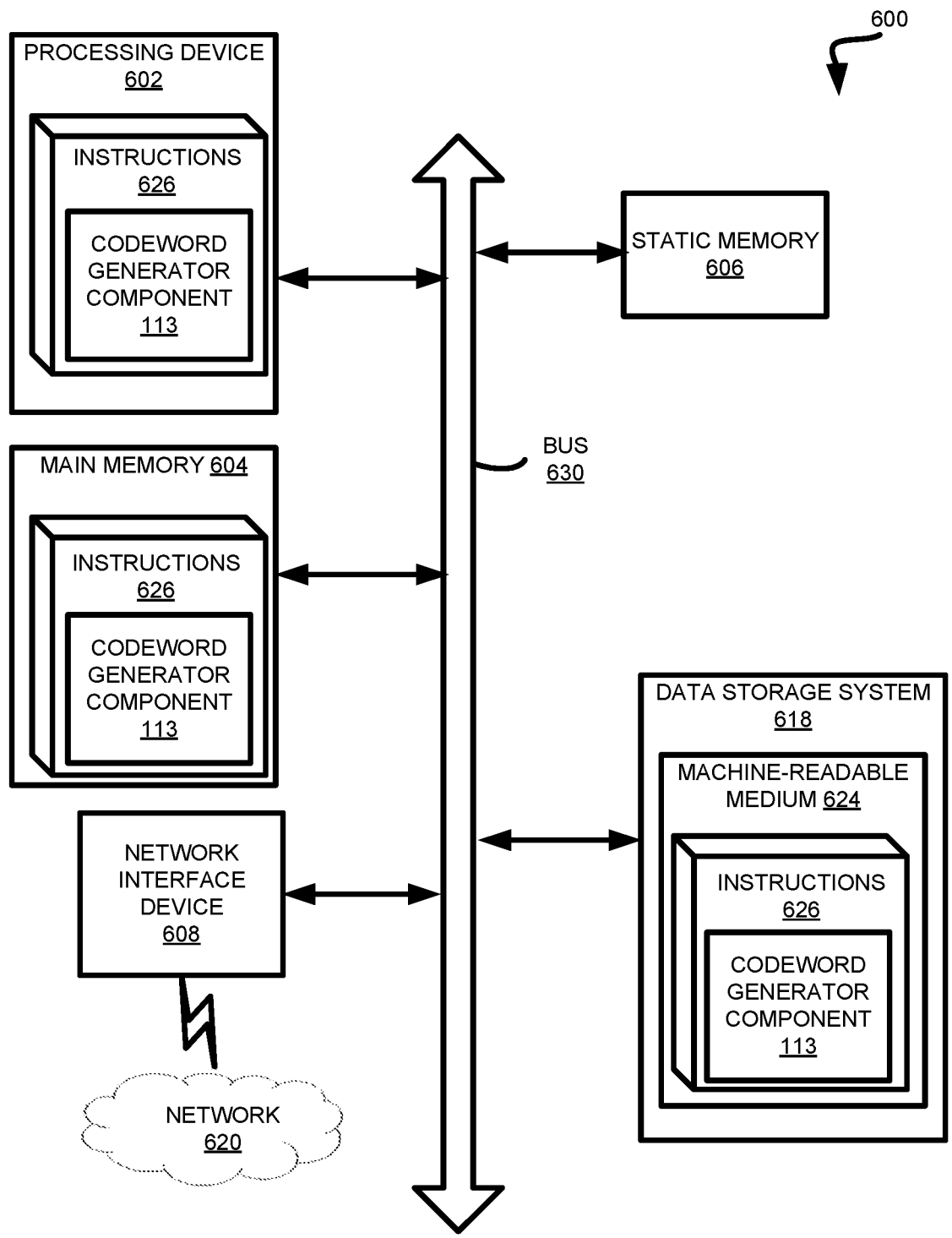
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the codeword generator component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a codeword generator component (e.g., the codeword generator component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
identifying, by the processing device, a plurality of partitions located on a die of the memory device;
selecting, based on evaluating a predefined criterion reflecting a physical layout of the die of the memory device, a first partition and a second partition of the plurality of partitions, wherein the evaluating is based on a physical address of the first partition and a physical address of the second partition; and
generating a codeword comprising first data residing on the first partition and second data residing on the second partition.

2. The system of claim 1, wherein evaluating the predefined criterion further comprises:
comparing a physical address of the first partition to a physical address of the second partition.

3. The system of claim 1, wherein selecting the first partition and the second partition of the plurality of partitions is further based on evaluating an error rate distribution of the die of the memory device.

4. The system of claim 3, wherein evaluating the error rate distribution of the die of the memory device comprises:
   comparing a first value of a data state metric for the first partition to a second value of a data state metric for the second partition.

5. The system of claim 3, wherein evaluating the error rate distribution of the die of the memory device comprises:
   comparing a first raw bit error rate for the first partition to a second raw bit error rate for the second partition; and
   responsive to determining a difference between the first raw bit error rate and the second raw bit error rate, generating the codeword.

6. The system of claim 3, wherein evaluating the error rate distribution of the die of the memory device is based on on-chip real-time measuring data.

7. The system of claim 3, wherein evaluating the error rate distribution of the die of the memory device is based on bit error counts measured during chip development.

8. A method comprising:
   identifying, by a processing device, a plurality of partitions located on a die of a memory device;
   selecting, based on evaluating a predefined criterion reflecting a physical layout of the die of the memory device, a first partition and a second partition of the plurality of partitions, wherein the evaluating is based on a physical address of the first partition and a physical address of the second partition; and
   generating a codeword comprising first data residing on the first partition and second data residing on the second partition.

9. The method of claim 8, wherein evaluating the predefined criterion further comprises:
   comparing a physical address of the first partition to a physical address of the second partition.

10. The method of claim 8, wherein selecting the first partition and the second partition of the plurality of partitions is further based on evaluating an error rate distribution of the die of the memory device.

11. The method of claim 10, wherein evaluating the error rate distribution of the die of the memory device comprises:
   comparing a first value of a data state metric for the first partition to a second value of a data state metric for the second partition.

12. The method of claim 10, wherein evaluating the error rate distribution of the die of the memory device comprises:
   comparing a first raw bit error rate for the first partition to a second raw bit error rate for the second partition; and
   responsive to determining a difference between the first raw bit error rate and the second raw bit error rate, generating the codeword.

13. The method of claim 10, wherein evaluating the error rate distribution of the die of the memory device is based on on-chip real-time measuring data.

14. The method of claim 10, wherein evaluating the error rate distribution of the die of the memory device is based on bit error counts measured during chip development.

15. A non-transitory computer readable medium comprising instructions, which when executed by a processing device, cause the processing device to perform operations comprising:
   identifying a plurality of partitions located on a die of a memory device;
   evaluating a predefined criterion reflecting a physical layout of the die of the memory device, wherein the evaluating is based on a physical address of a first partition and a physical address of a second partition;
   evaluating an error distribution rate of the die of the memory device;
   selecting, based on the predefined criterion and the error distribution rate, the first partition and the second partition of the plurality of partitions; and
   generating a codeword comprising first data residing on the first partition and second data residing on the second partition.

16. The non-transitory computer readable medium of claim 15, wherein evaluating the predefined criterion further comprises:
   comparing a physical address of the first partition to a physical address of the second partition.

17. The non-transitory computer readable medium of claim 15, wherein evaluating the error rate distribution of the die of the memory device comprises:
   comparing a first value of a data state metric for the first partition to a second value of a data state metric for the second partition.

18. The non-transitory computer readable medium of claim 15, wherein evaluating the error rate distribution of the die of the memory device comprises:
   comparing a first raw bit error rate for the first partition to a second raw bit error rate for the second partition; and
   responsive to determining a difference between the first raw bit error rate and the second raw bit error rate, generating the codeword.

19. The non-transitory computer-readable medium of claim 15, wherein evaluating the error rate distribution of the die of the memory device is based on on-chip real-time measuring data.

20. The non-transitory computer-readable medium of claim 15, wherein evaluating the error rate distribution of the die of the memory device is based on bit error counts measured during chip development.

* * * * *